US012562155B2

(12) United States Patent
Murthy et al.

(10) Patent No.: US 12,562,155 B2
(45) Date of Patent: Feb. 24, 2026

(54) INTELLIGENT MEETING INSIGHT AND COLLABORATION SYSTEM WITH REAL-TIME TOPIC EXTRACTION AND ENGAGEMENT ENHANCEMENTS

(71) Applicant: Mitel Networks Corporation, Kanata (CA)

(72) Inventors: Tejas Kanduri Aswathanarayana Murthy, Karnataka (IN); Logendra Naidoo, Ottawa (CA)

(73) Assignee: Mitel Networks Corporation, Kanata (CA)

( * ) Notice: Subject to any disclaimer, the term of this patent is extended or adjusted under 35 U.S.C. 154(b) by 218 days.

(21) Appl. No.: 18/372,584

(22) Filed: Sep. 25, 2023

(65) Prior Publication Data

US 2025/0104699 A1    Mar. 27, 2025

(51) Int. Cl.
| | |
|---|---|
| *G10L 15/18* | (2013.01) |
| *G06F 3/04817* | (2022.01) |
| *G10L 15/183* | (2013.01) |
| *H04L 12/18* | (2006.01) |
| *H04L 65/1093* | (2022.01) |

(52) U.S. Cl.
CPC ...... *G10L 15/1815* (2013.01); *G06F 3/04817* (2013.01); *G10L 15/183* (2013.01); *H04L 12/1822* (2013.01); *H04L 12/1831* (2013.01); *H04L 65/1093* (2013.01)

(58) Field of Classification Search
CPC .............. G10L 15/1815; G10L 15/183; G06F 3/04817; H04L 12/1822; H04L 12/1831; H04L 65/1093; G06Q 10/103; G06Q 10/101; G06Q 10/1095
See application file for complete search history.

(56) References Cited

U.S. PATENT DOCUMENTS

| | | | |
|---|---|---|---|
| 9,652,113 B1 | 5/2017 | Colson et al. | |
| 11,539,845 B1 * | 12/2022 | Fowers | ................. H04L 65/403 |
| 11,681,819 B1 * | 6/2023 | Surazski | ............. G06F 16/9535 |
| | | | 726/28 |

(Continued)

OTHER PUBLICATIONS

Slack Technologies, LLC, "What is a Channel", retrieved from Internet on Sep. 27, 2023 at https://slack.com/features/channels.

(Continued)

*Primary Examiner* — Stella L. Woo

(57) ABSTRACT

A computerized real-time data processing system for determining one or more topics presented during a conference utilizes a natural language processor (NLP) in communication with a conference server, wherein the NLP is configured to identify one or more topics presented in a conference based on identifying thematic elements in the speech of a conference host or participant, or in conference audio. One or more participant devices are in communication with the conference server, wherein each of the one or more participant devices has a display that displays conference topic files, wherein each conference topic file represents (a) a topic that was previously discussed during the conference, or (b) a topic that is presently being discussed during the conference. Each participant may, using the participant device unique to that participant, join a conference when a topic of interest is identified.

20 Claims, 5 Drawing Sheets

(56)     References Cited

U.S. PATENT DOCUMENTS

| | | | |
|---|---|---|---|
| 12,192,018 B1 * | 1/2025 | Roper | ..................... G10L 15/26 |
| 12,323,673 B2 * | 6/2025 | Burkitt | ................ G06F 16/7844 |
| 2007/0124752 A1 * | 5/2007 | Sakai | ................. H04N 21/4722 |
| | | | 725/39 |
| 2017/0060917 A1 | 3/2017 | Marsh | |
| 2022/0147225 A1 * | 5/2022 | Freisthler | ............ H04L 12/1827 |
| 2022/0182253 A1 * | 6/2022 | Pawar | ................. H04L 12/1818 |
| 2022/0308742 A1 * | 9/2022 | Ziv | ........................ G06F 16/784 |
| 2022/0353211 A1 * | 11/2022 | White | ..................... H04L 51/02 |
| 2022/0368745 A1 | 11/2022 | Rajendran et al. | |
| 2023/0110945 A1 | 4/2023 | Vendrow | |
| 2023/0137043 A1 * | 5/2023 | Swerdlow | ........... H04L 12/1822 |
| | | | 709/204 |
| 2023/0353708 A1 * | 11/2023 | Springer | ................ H04N 7/155 |
| 2023/0403174 A1 * | 12/2023 | Mohanty | ............ H04L 12/1831 |

OTHER PUBLICATIONS

The Verge, "Slack intoduces shared documents to let companies collaborate", retrived from the internet on Sep. 27, 2023 at https://www.theverge.com/2017/9/12/16291246.

* cited by examiner

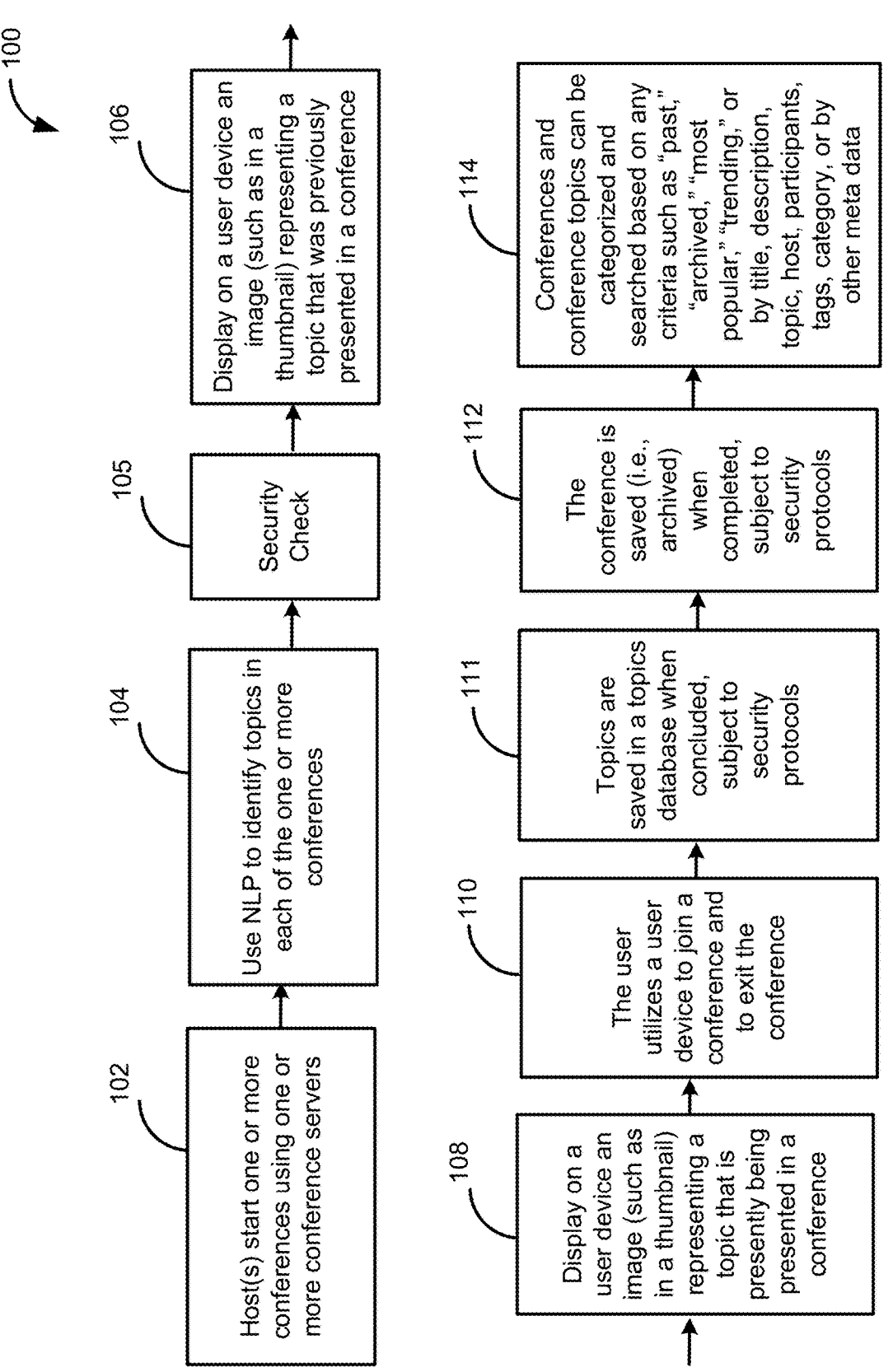

100

102 Host(s) start one or more conferences using one or more conference servers

104 Use NLP to identify topics in each of the one or more conferences

105 Security Check

106 Display on a user device an image (such as in a thumbnail) representing a topic that was previously presented in a conference 108 Display on a user device an image (such as in a thumbnail) representing a topic that is presently being presented in a conference 110 The user utilizes a user device to join a conference and to exit the conference 111 Topics are saved in a topics database when concluded, subject to security protocols 112 The conference is saved (i.e., archived) when completed, subject to security protocols 114 Conferences and conference topics can be categorized and searched based on any criteria such as "past," "archived," "most popular," "trending," or by title, description, topic, host, participants, tags, category, or by other meta data

FIG. 3

INTELLIGENT MEETING INSIGHT AND COLLABORATION SYSTEM WITH REAL-TIME TOPIC EXTRACTION AND ENGAGEMENT ENHANCEMENTS

BACKGROUND

In today's business environment, meetings (or conferences) play a crucial role. However, conferences are typically restricted to specific participants who are invited because they are directly involved in a project to which the conference pertains. While in the conference, participants may not be able to attend to other projects, which is detrimental if a participant must be present for an aspect of a conference that is unsuited to his/her expertise or interest. It may also prevent organizational members (also called users or persons) who were not invited conference participants from accessing valuable conference information and participating in a conference having portions that benefit their projects.

Existing conference systems offer various methods for users to participate. Typically, a user receives a conference invitation by email, calendar invitation, or a direct link. The invitation typically includes information such as the conference date, time, and joining instructions. The user can accept the invitation and later join the conference as a conference participant.

To actually join the conference, the user typically clicks on the provided conference link, which may be a hyperlink within an email or calendar event. Alternatively, the invitation may provide a meeting ID or access code that can be entered into an invitation system's interface. As an example, the user can proceed by clicking a "Join" or "Join Meeting" icon. This opens the meeting system interface, wherein the user can expect to become a meeting participant joining other participants and see them if the user's (now a conference participant) video functionality is enabled.

Participating in live conference discussions permits a better understanding of a conference topic and resolving questions or concerns in real-time, rather than relying on reviewing a recorded conference session, a transcript, or a summary. With numerous organizational meetings taking place simultaneously, it becomes challenging for a person to identify the most relevant conference for his/her job or project and when to join at the appropriate time. It is also challenging for a host to identify all persons who would be meaningful conference participants. While conference agendas are often included in conference invitations, the agenda is only a summary that may not include each conference content topic, or the conference content may not precisely align with the conference agenda.

Many conference systems offer the option to record all or part of a conference. A host or participants can choose to record all or part of a conference and afterwards the recorded link can be shared or stored for later access to the conference's content. A program called Slack primarily focuses on team collaboration, information sharing, and project management, rather than analyzing and categorizing conference content in real time.

There is a need for providing a shared space in which all, or a plurality of, ongoing conferences can be accessed by numerous organization members (referred to as "users") who were not invited participants to some or all of the conferences. This allows persons from different organizational departments and projects to (1) review conference topics in real time as the topics are identified, and (2) participate in a conference or a portion of the conference if interested. This would enable the transfer of knowledge, ideas, and technological advancements between projects and personnel, thereby fostering innovation and collaboration.

BRIEF DESCRIPTION OF THE DRAWINGS

The subject matter of the present disclosure is particularly pointed out and distinctly claimed in this specification. A more complete understanding of the present disclosure, however, may be obtained by referring to the detailed description and claims when considered in connection with the drawing figures, wherein:

FIG. 3 is an exemplary computer-implemented method according to aspects of this disclosure.

Figure 1:
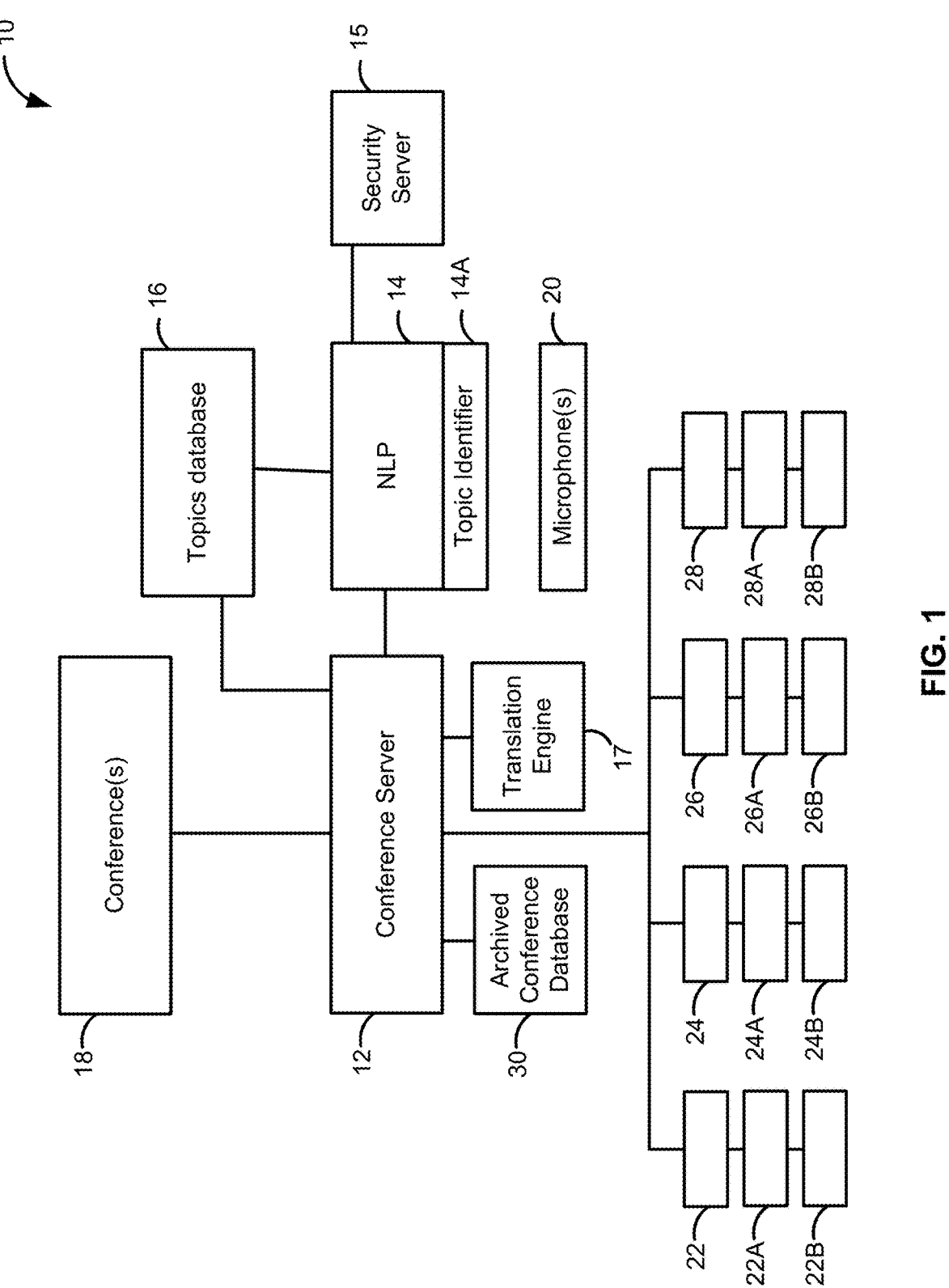
FIG. 1 is an exemplary system according to aspects of this disclosure.

It will be appreciated that structures, devices, and method steps in the figures are illustrated for simplicity and clarity and have not necessarily been drawn to scale. For example, the dimensions of some of the structures in the figures may be exaggerated relative to other structures to help to improve understanding of illustrated embodiments of the present disclosure.

DETAILED DESCRIPTION

A system and method according to this disclosure enables real-time content analysis and dissemination of a plurality of (and perhaps all) organizational conferences simultaneously, which enables continuous access by organizational users to files (preferably presented as thumbnails) of on-going conferences, and the ability to join and leave a conference when the user desires. The system and method incorporate an interface for identifying and presenting topics of conferences to organizational users that were not invited conference participants. Leveraging a server infrastructure, a system or method of this disclosure summarizes topics of ongoing conferences and delivers the condensed topic information as a thumbnail file (which can include image(s), video(s), audio, and/or text) of a topic, and transmit thumbnail of each topic to user devices, wherein users can then review the thumbnail and decide whether and when to join a conference.

The system and method, which preferably occurs in real time, herein involves (1) monitoring on-going conferences, which could be cloud-based or operated on a local server, (2) detecting content and topics from these conferences, and (3) creating a thumbnail file of each conference topic and transmitting the thumbnail to user devices. As each conference (also referred to as a meeting) progresses, the system and method employ a natural language processing (NLP) component to extract keywords or phrases from the presented conference content in order for the thumbnails to dynamically be created based on the content changes of a conference that reflect a different topic, so that each topic has a unique thumbnail. Thus, all of the thumbnails for a conference represent a real-time, topic-by-topic analysis of the conference. Recognizing that the discussed topics change over time, a display on a user's participant device may have one or more conference windows that display both a thumbnail of an ongoing conference's current topic and a list (or cached thumbnails) of thumbnails representing topics already covered in the conference.

The topics are identified utilizing a natural language processor (NLP) analysis instead of relying solely on a conference agenda or conference slide content. The NLP can determine topics by analyzing one or more of the (a) speech of the host and participants, and (b) conference audio. This is an improvement over a system such as YouTube's thumbnails, which are typically static, do not adapt to conference content as the conference progresses, and do not provide the level of content analysis as do the systems and methods disclosed herein.

Users are provided the choice to join a live conference discussion or select a specific topic from an ongoing conference to which to listen. If a user chooses to become a participant in a conference for a particular topic, he/she can choose to listen to the conference discussion on that topic and even actively engage by joining the conference as a participant and interacting with the host or other participants. For instance, in the context of a conference on "Agile methodologies and implementation steps," some users may be interested in understanding the overall agile methodology, while others may be interested in its implementation for specific projects, and others may not be interested at all and chose not to participate. A user can join an on-going conference at any time he/she wishes unless joining is blocked for any reason, such as for organizational security, and the user can leave the conference at any time.

Using an interface that provides a window, wherein a thumbnail in the window can be viewed in detail by a user hovering a cursor over the thumbnail, wherein the window includes a thumbnail of a current topic being discussed and thumbnails of topics already covered, a user can join the conference as a participant in the live discussion or navigate to a topic that was already covered and access it from a database.

The systems and methods of this disclosure thus facilitate internal collaboration by providing users with an overview of ongoing conferences and the ability to join relevant conferences for improved collaboration. YouTube's thumbnails, as an example, are only aimed at attracting viewers to videos and do not serve a collaboration purpose within an organizational context.

The systems and methods of this disclosure also facilitate navigation of archived conferences by categorizing conferences into sections such as "past," "archived," "most popular," or "trending." They encourage users to engage others and collaborate based on the user's projects or interests. YouTube's thumbnails, in contrast, are primarily geared towards general viewer engagement based on publishing and advertising principles that take into account the creator's metadata.

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially generated propagated signal. The computer storage medium is non-transitory and can also be, or be included in, one or more separate physical components or media (e.g., solid-state memory that forms part of a device, disks, or other storage devices).

As used herein, "engine" refers to a data-processing apparatus, such as a processor, configured to execute computer program instructions, encoded on computer storage medium, wherein the instructions control the operation of the engine. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus.

Turning now to the Figures, wherein the purpose is to describe embodiments of this disclosure and not to limit the scope of the claims, FIG. 1 shows a system 10 according to aspects of this disclosure. System 10 has a conference server 12, which can be any suitable server, computer, or electronic device. Conference server 12 is in communication with a natural language processor (NLP) 14 that includes, or is in communication with a separate, topic identifier 14A. Topic identifier 14A identifies topics based on words or phrases detected by the NLP that are (1) being spoken by one or more of a conference host and conference participants, and (2) audio in the conference(s), such as videoconference(s), 18. Conference(s) 18 are one or more conferences generated by conference server 12.

One or more microphones 20 may be in communication with NLP 14 and are configured to receive the speech of a host and/or the conference participants, and optionally audio from the conference(s) 18.

If multiple conference(s) 18 are simultaneously presented at different locations, or with different hosts and participants, there may be multiple one or more microphones 20 at different locations. Further, while one NLP 14 and topic identifier 14A are shown, there could be multiple NLPs 14 and topic identifiers 14A for each of multiple conference(s) 18, although a single NLP 14 and topic identifier 14A could service multiple conference(s) 18.

NLP 14 is in direct or indirect communication with a security server 15 and a topics database 16. Security server 15 is configured to identify words or phrases that indicate that the conference or conference topic should not be disclosed to others than the invited participants to a conference, or to users that were not invited to the conference but who have a sufficient security clearance to receive the conference topic information. Other users will be blocked from receiving the secure topics, and the secure topics will not be stored in the topics database 16 or the archived conference database 30, unless stored with access limited to users with the appropriate security clearance.

Topics database 16 stores the topics for each of the conference(s) 18 that are identified by NLP 14 and topic identifier 14A, subject to the security restrictions. Each topic is stored as thumbnail file that can include one or more of video, one or more images, audio, and text for a topic of conference(s) 18, and these thumbnail files (or simply "thumbnails") are made available to users on respective user devices 22, 24, 26, and 28.

Translation engine 17 is optional, is in direct or indirect communication with NLP 14 (as shown, translation engine is in direct communication with, or is part of, conference server 12) and translates speech or audio from one language into the language utilized by NLP 14.

An archived conference database 30 archives conference(s) 18 when a conference has concluded and makes the conference available to organizational users subject to the previously discussed security restrictions. Or a conference may be one that the host or organization wishes not to store for any reason.

One or more user devices 22, 24, 26, and 28 are in communication with conference server 12. Each user device has, respectively, a display 22A, 24A, 26A, and 28A, and a graphical user interface 22B, 24B, 26B, and 28B. Each display permits a user to view the thumbnail of each topic of the conference(s) 18. Each GUI permits a user to participate in a conference, leave a conference, or access a saved conference topic.

Figure 2:
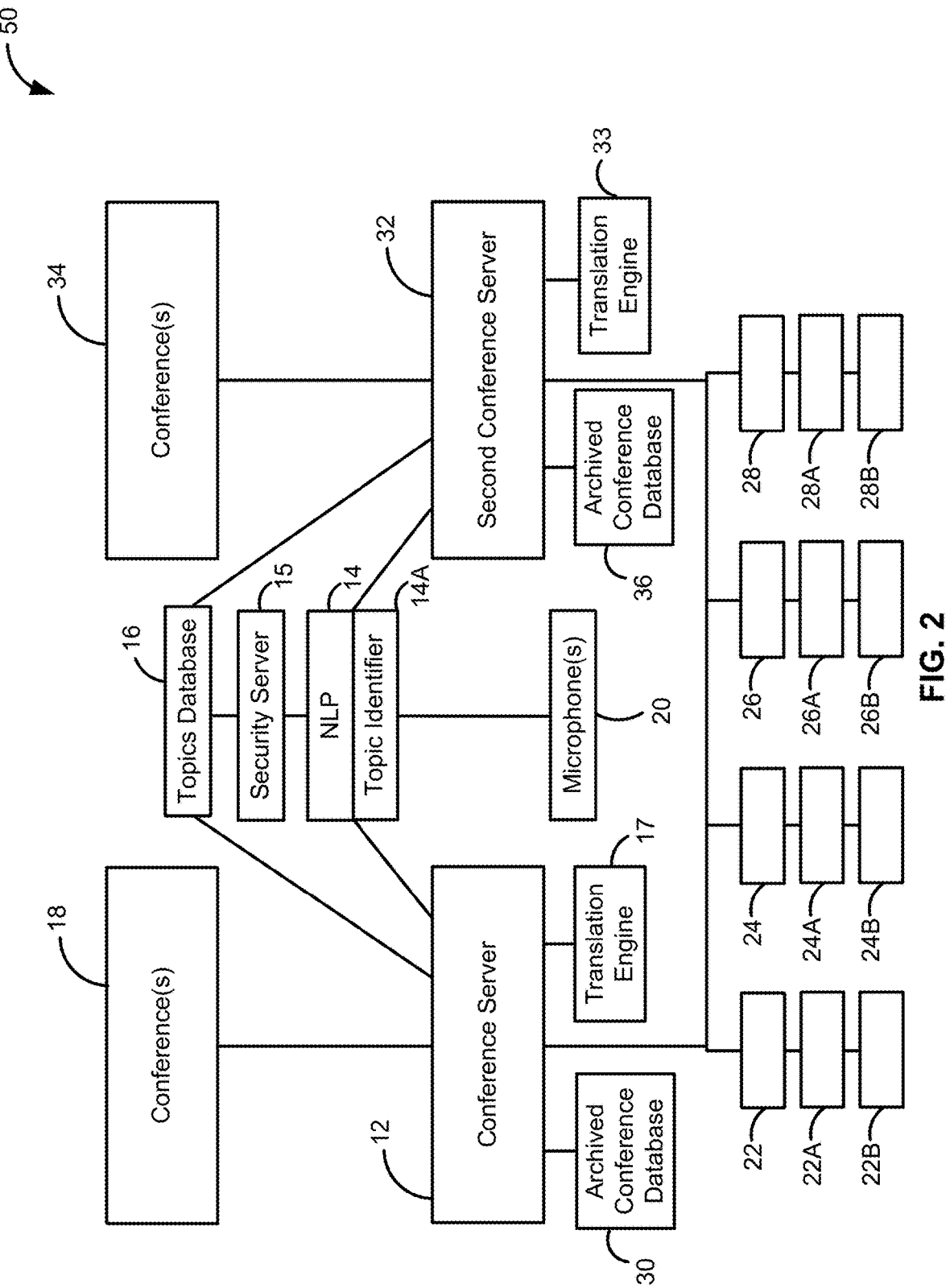
FIG. 2 is another exemplary system according to aspects of this disclosure.

FIG. 2 shows an alternate system 50 that is the same as system 10 except that it has conference server 12 and a second conference server 32 that hosts conference(s) 34. Given the size of an organization, there could be any number of conference servers presenting any number of conference(s) 18, 34. In this embodiment a second archived conference database 36, which functions the same as archived conference database 30, and a second translation engine 35, which functions the same as translation engine 17, are in communication with second conference server 32.

FIG. 3 shows an exemplary method 100 of this disclosure. At step 102 a host(s) begins one or more conferences utilizing one or more conference servers. At step 104 the NLP 14 and topics identifier 14A identify topics in each of the one or more conferences by analyzing one or more of the host's speech, the conference participant's speech, and conference audio. At step 105, the identified topics are checked by the security server 15 for words or phrases that indicate sensitive or confidential topics that should not be shared with anyone other than the invited conference participants or by users with a sufficient security clearance.

At steps 106, 108, each identified topic for each of the conference(s) 18, 34 is presented as a thumbnail on a display 22A, 24B, 26B, or 28B of a user device 22, 24, 26, or 28.

Each thumbnail is a file that has one or more of a visual, text, one or more images, and audio portion with sufficient information to permit the user to identify the topic. The user may then use his/her respective GUI 22B, 24B, 26B, or 28B to connect to and participate in the conference at step 110. A user can simply listen to the conference or may actively participate, such as by speaking or sending chat messages to the conference host or to other conference participants.

Alternatively, a user who is interested in a particular topic need not be monitoring the conference from the beginning waiting for the topic to be covered. Instead, he/she can set a reminder based on the content/keyword(s) of the topic, and if that topic is presented the user would, for example, receive a call to his/her cell phone or an email or text requesting the user to join the conference.

As each topic in a conference is completed and a new topic is started, a thumbnail of the new topic will appear on the respective user displays 22A, 24A, 26A, and 28A. The new topic thumbnail can replace the prior topic thumbnail, or the topic thumbnails can be shown in a cascading view or be shown in any suitable manner. Preferably the topic thumbnails are in a thumbnail window on the display 22A, 24A, 26A, or 28A of each user device, such as in a thumbnail window on the display's task bar. The user can view all of the topic thumbnails of a conference by, for example, hovering his/her cursor over the thumbnail window of topics for a conference in order to expand the window to see each topic thumbnail. The user may select a topic that was previously discussed and the portion of the conference that contained that topic can be accessed by a GUI 22B, 24B, 26B, or 28B from the archived conference database 30 or 36, or from topics database 16, and played on user device 22, 24, 26, or 28.

At step 111, the identified topics are stored in topics database 30, 36, unless blocked by security server 15, and if stored access to a topic may be limited by security server 15. When a conference concludes it can be saved at step 112 to archived conference database 30 or 36 subject to security protocols.

At step 114 the archived (or saved) conferences and conference topics can be categorized and searched based on any criteria such as "past," "archived," "most popular," "trending," or by title, description, topic, host, participants, tags, category, or by other meta data. Metadata refers to additional information provided by any suitable component of a system 10 or 50, such as the conference server 12, topic identifier 14A, or archived conference database 30, 36, about a video, such as titles, descriptions, tags, categories, and other related fields. Content creators, which in this case could be the conference host or any person who created the conference video, images, or text, or any person with authorization to add metadata to an archived conference, can utilize system 10 or 50 to add metadata to improve the searchability/discoverability of a conference, as the metadata assists search algorithms, categorization, and recommendations.

Figure 4:
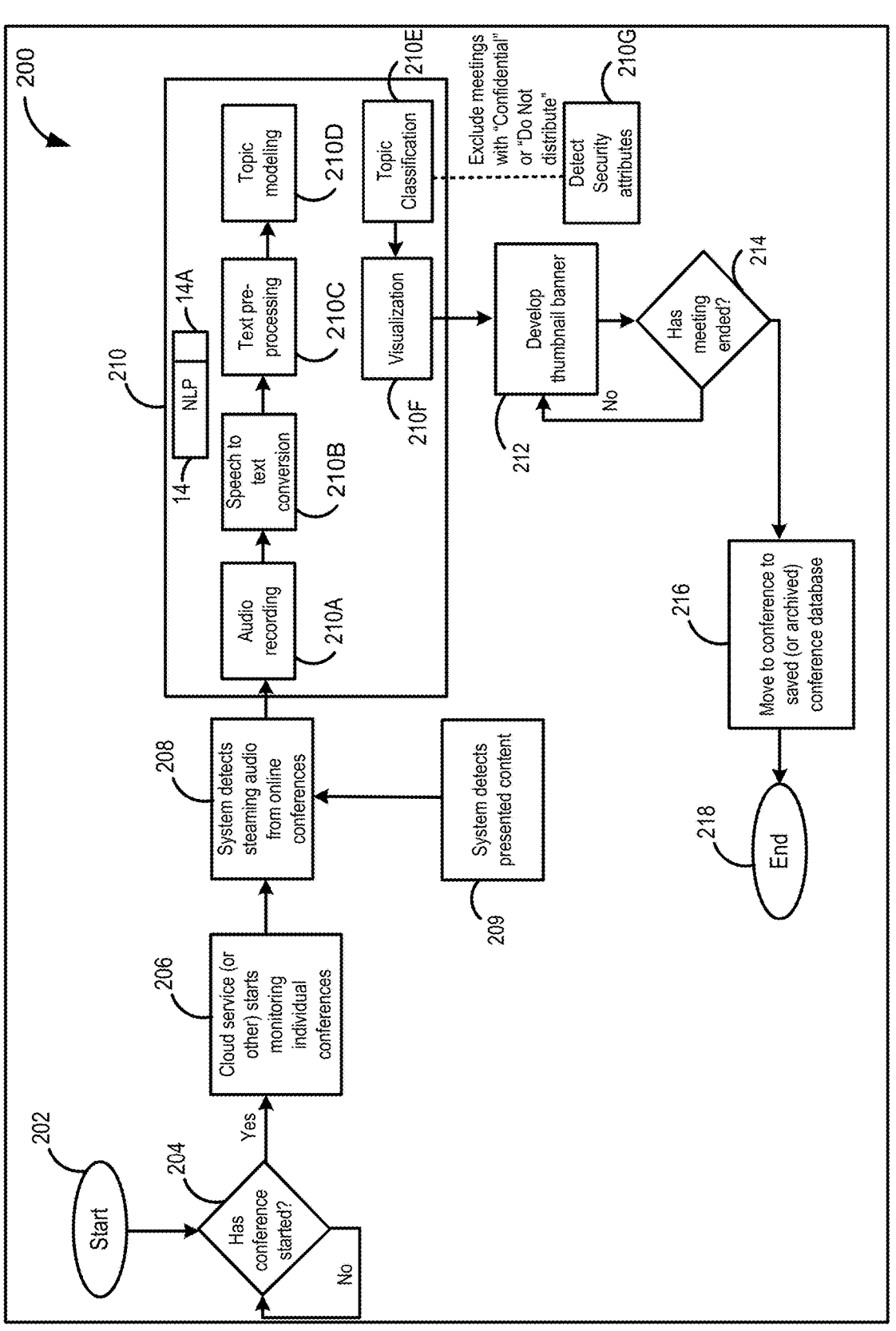
FIG. 4 is another exemplary computer-implemented method according to aspects of this disclosure.

FIG. 4 illustrates a method 200 according to this disclosure. At step 202, the method starts. At step 204, the method determines if the conference has started. If the conference has started, at step 206 individual conferences are monitored and at steps 208, 209, a system (such as system 10 or system 50) detects the conferences' host and participant voice(s) and/or conference audio. At step 210, the NLP 14 and topics identifier 14A determine the topics based on words and phrases in the voices and/or conference audio. At step 210A, speech and audio are received by NLP 14, at step 210B speech (and/or audio) to text conversion takes place. The text is then pre-processed at step 210C, and a topic is modelled at step 210D. At step 210E, the topic is classified and possible security issues with the topic are identified at step 210G. If no security issues are identified that prevent distribution of the topic to users, at step 210F a thumbnail of the topic is created, which can include one or more of video, one or more images, audio, and text that permit a user to identify the topic.

At step 212, a thumbnail of the topic is communicated to the user devices where it is shown on the respective displays 22A, 24A, 26A, 28A of each user device. At step 214, a determination is made whether the conference has ended. Once the entire conference has ended, it is stored in the archived conference database 30 or 36. At step 218, the method ends.

Figure 5:
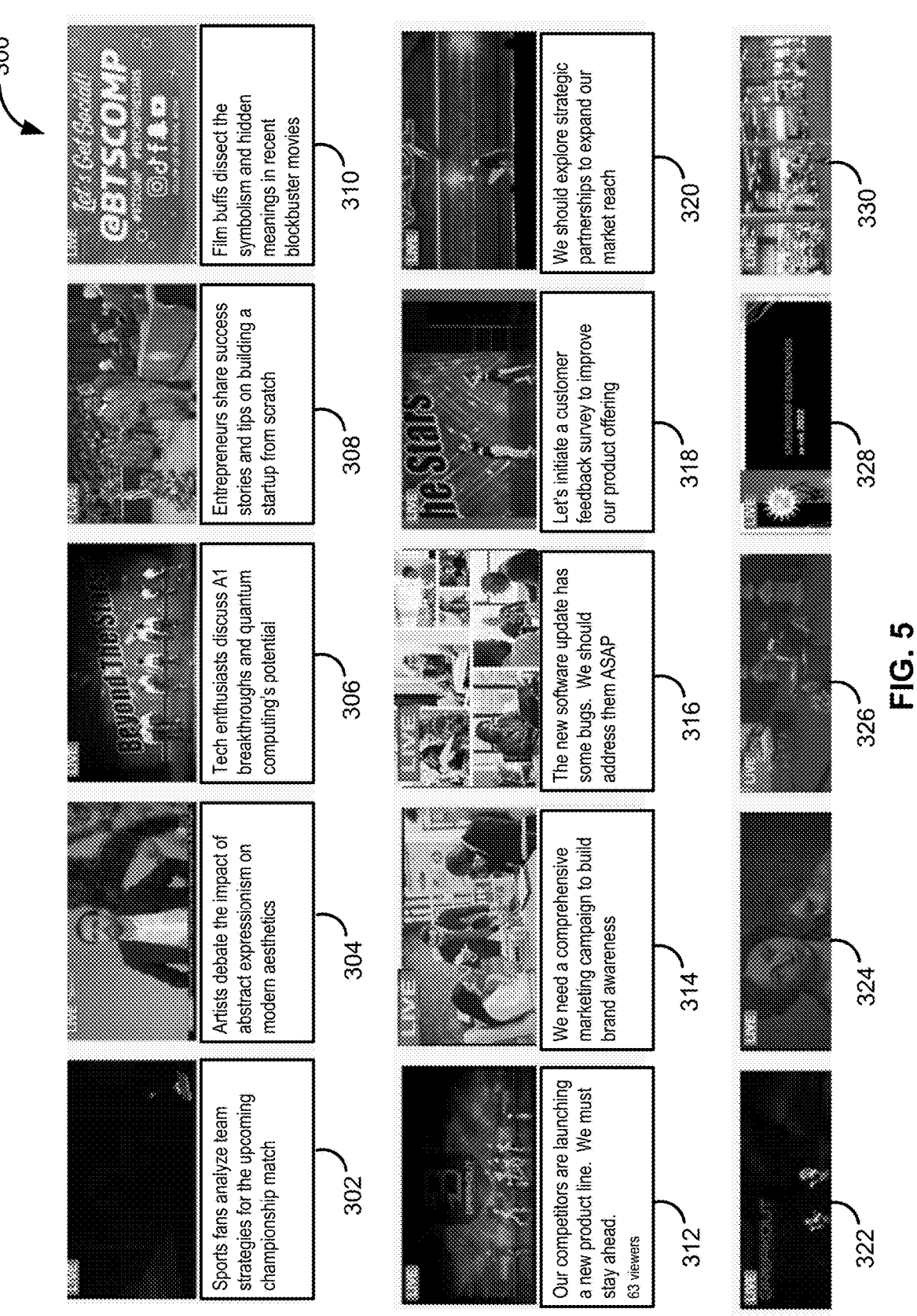
FIG. 5 shows exemplary thumbnails depicting meeting topics.

FIG. 5 shows numerous examples 302-330 of images of thumbnails, which can be presented on the display of a user device.

Use Example 1: Agile Project Collaboration and Knowledge-Sharing

A multinational technology company has multiple project teams working on different Agile projects simultaneously. Each project team conducts regular online meetings to discuss project progress, challenges, and knowledge sharing. However, due to the project-specific nature of these meetings, persons working on other projects may not be invited to the meetings and may not stay informed of the work of other project teams. There would be no cross-pollination of knowledge whereby users can leverage insights shared during these meetings. To address this challenge, the company implements the meeting system and method of this disclosure, which is equipped with intelligent monitoring capabilities. The system and method enhance collaboration and knowledge sharing utilizing the method 200 shown in FIG. 4 and one of the systems 10 or 50:

(1) The cloud services, or local servers, continuously monitor all (or a plurality of) online meetings taking place within the organization. The system and method employ advanced language analysis algorithms to detect streaming from the online meetings, ensuring comprehensive coverage across the company's projects.

(2) Once a conference is streamed, detection algorithms are executed and the system and method automatically analyze the presented content using an NLP component, which extracts relevant keywords and phrases, thus capturing the essence of ongoing discussions and identifying topics.

(3) A user-friendly interface, such as in a snapshot/ highlight window, provides insight on a topic being discussed or that has been discussed. As a user hovers his/her cursor over a conference topics window; he/she can view the topic under discussion, enabling him/her to gauge the conference's relevance to specific interests.

(4) The user interface also presents a list of topics already covered during the conference, generated through NLP analysis rather than relying solely on conference agenda metadata. This list allows user's to quickly assess the conference's content and determine if it aligns with the user's informational needs.

(5) Users have the flexibility to choose their level of engagement in the conference so they can opt to join in a live discussion and actively participate and exchange ideas with the conference host and participants. Alternatively, participants can click on a specific topic from the list of covered topics, thereby accessing the relevant portion of the conference from a database for a more focused exploration.

This example demonstrates how the disclosed system and method empowers participants to actively engage in cross-project collaboration and knowledge-sharing. It eliminates the barriers of project-specific meetings, allowing participants from different projects to access and benefit from valuable insights usually not ascertained through titles and agenda; techniques, and implementation strategies discussed during the livestream are more helpful, such as in Agile discussion formats. By leveraging real-time topic extraction and intelligent interface design, the system enhances collaboration and maximizes the utilization of corporate knowledge across the organization.

Use Example 2

Users join a meeting via their preferred collaboration tool, e.g., MiTeam Meetings, Zoom, Microsoft Teams, etc. Instead of the user waiting for a meeting invitation from a host, the user has an interface to view all the conferences happening in parallel. The interface facilitates provides the user with information related to trending topics/tech-oriented topics, or other topics.

Since the topic being discussed changes over time, the server has the ability to summarize all of the conferences. It is also useful if a person knows that he/she is on a project and is talking about a topic (e.g., AI/ML). If that topic is being raised elsewhere in the organization the content may be important to others. It would be helpful and enhance collaboration to have a parallel meeting to which to connect, wherein users anywhere in the organization would have the ability to pull participants from one discussion into another.

In this example, a method for real-time content analysis and adaptive thumbnail generation in a cloud-based collaboration system, comprises: (a) monitoring online meetings using a cloud service or local server; (b) detecting streaming audio from online conferences within the monitored meetings; (c) detecting presented content within the monitored meetings; (d) applying a natural language processing (NLP) component to extract keywords and phrases from the presented content; (e) implementing a "window of analysis" function that provides a running view of content for a definable segment of the monitored meetings, wherein the definable segment is a modifiable parameter, including key contributions of a notable speaker or a discrete timeframe of analysis; (f) generating adaptive thumbnail banners based on the extracted content, wherein the adaptive thumbnail banners represent the analysis and appear in a dashboard of a user device display; (g) updating the adaptive thumbnail banners as the meeting progresses and different topics are addressed; (h) cumulatively providing the analysis and adaptive thumbnail banners for simultaneous online meetings; (i) transferring concluded meetings to a separate section of the dashboard for "past" or "archived" events, wherein the concluded meetings are stored in a database; (j) optionally displaying the most insightful topics based on the most watched segments in a "most popular" or "trending" section; (k) detecting security attributes within meetings, including exclusion of meetings containing specific words such as "CONFIDENTIAL" or "DO NOT DISTRIBUTE," or compliance with policies that exempt certain meetings from content analysis and thumbnail generation.

Coupled with Mitel or other videoconferencing application providers, a window-of-analysis approach provides a running view of content for a definable segment (i.e., topic) of all the meetings in concurrence. It allows an enterprise community to focus on organic, unfolding meeting contributions of participants along specific segments of analysis, thereby saving time of the users before joining an event. The system generates unique adaptive thumbnail banners which are different than YouTube UI "widgets" because they are not static, but dynamic as each is based on the changing extracted content.

These thumbnails, which may include audio and video highlights as well as detected cover/title slides, serve as visual representations of the analyzed content. The adaptive nature of these thumbnails ensures that they dynamically update as the meeting progresses, providing an evolving overview of the discussion.

The user device dashboard component—while it is simply a software interface—is helpful as it gathers and presents the adaptive thumbnail banners for multiple concurrent online meetings. This context-gathering approach as opposed to titles and static agenda, allows users to access a consolidated view of topics discussed in conferences.

While the proposed systems and methods are intended for an organizational setting, they are also applicable to public viewing sites or portals.

The description of embodiments provided herein is merely exemplary and is intended for purposes of illustration only; the following description is not intended to limit the scope of the claims. Moreover, recitation of multiple embodiments having stated features is not intended to exclude other embodiments having additional or fewer features or other embodiments incorporating different combinations of the stated features. The methods and systems according to this disclosure and claims can operate in a premise, cloud-based, or hybrid environment.

The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. A computerized real-time data processing system for determining one or more topics presented during a conference, the real-time data processing system comprising:
    a natural language processor (NLP) in communication with a conference server and topic identifier, wherein topic identifier identifies one or more topics presented in a conference presented by the conference server based on the NLP's identification of thematic elements in a conference participant's speech and/or a host's speech and wherein the topic identifier continuously updates the one or more topics as the conference progresses;
    a topics database in communication with the conference server and in communication with the NLP, wherein the topics database stores each of the one or more conference topics and creates a thumbnail of each of the one or more conference topics, wherein the thumbnail represents a real-time, topic-by-topic analysis of the conference;
    one or more participant devices, wherein each of the one or more participant devices is assigned to a unique participant and is in communication with the topics database; and
    a display on each participant device that is configured to display thumbnails, including at least one of the thumbnails represents (a) a topic that was previously discussed during the conference, and (b) another of the thumbnails represents a topic that is presently being discussed during the conference, wherein the at least one of the thumbnails is updated as the conference progresses and different topics are addressed in the conference;
    wherein each participant may, using the participant device unique to that participant, join a conference when a topic of interest to the participant is identified.

2. The computerized real-time data processing system of claim 1, wherein the conference server is further configured to present a plurality of conferences simultaneously, and the NLP is configured to identify one or more topics of each conference based on the conference participant's speech and/or a host's speech, and wherein the display on each conference participant device displays thumbnails of each of the topics of each of the plurality of meetings.

3. The computerized real-time data processing system of claim 2, wherein the conference server includes an interface configured to permit each participant device to communicate simultaneously in at least some of the plurality of conferences.

4. The computerized real-time data processing system of claim 1 that further includes one or more microphones in communication with the NLP, wherein the one or more microphones are configured to receive and transmit the participant's speech and/or the host's speech to the NLP.

5. The computerized real-time data processing system of claim 1, wherein one or both of the NLP and the topic identifier are further configured to identify synonymous and semantically similar (a) words, and (b) phrases to words and phrases included in the participants' speech or the host's speech to assist in identifying topics.

6. The computerized real-time data processing system of claim 1 that further includes a security server in communication with the NLP, wherein the security server is configured to detect security keywords indicating restrictions or distribution of a topic content and that directs the NLP or the conference server to block the content from being provided to certain of the participant devices.

7. The computerized real-time data processing system of claim 1, wherein the NLP is further configured to translate words from one language into another language.

8. A computerized real-time data processing method for determining one or more topics being presented during a conference and permitting a participant to join the conference, the computerized real-time data processing method comprising the following steps:
    identifying, utilizing an NLP in communication with topic identifier and a conference server, one or more topics based on thematic elements in a conference participant's speech and/or a host's speech, wherein the topic identifier continuously updates the one or more topics as the conference progresses;
    storing, in a topics database, the one or more topics presented during the conference;
    displaying, on a display on a participant device that is in communication with the NLP (a) a thumbnail representing a topic that was previously discussed during the conference, and (b) a thumbnail representing a topic that is presently being discussed during the conference, wherein the thumbnail represents a real-time, topic-by-topic analysis of the conference and the thumbnail is updated as the conference progresses and different topics are addressed in the conference; and
    utilizing the participant device, the participant joining all of, or a portion of, the conference when a topic of interest to the participant is identified by review of the thumbnails.

9. The computerized real-time data processing method of claim 8, wherein each topic is projected on the participant device as a thumbnail, wherein the thumbnail includes one or more of (a) video, (b) one or more images, (c) audio, and (d) text related to the topics identified by the NLP.

10. The computerized real-time data processing method of claim 8, wherein the NLP is also configured to analyse audio generated by a conference file of the conference to identify conference topics.

11. The computerized real-time data processing method of claim 8, wherein the conference server provides a running view on the participant device of a portion of extracted content for a topic, wherein the NLP identifies the portion based upon (a) an identity of a person speaking, (b) keywords identified by the NLP, or (c) a predetermined timeframe within the conference for the topic.

12. The computerized real-time data processing method of claim 9, wherein the thumbnail includes extracted content related to a topic and the thumbnail is positioned on a dashboard of the participant device.

13. The computerized real-time data processing method of claim 9, wherein the still image thumbnail is removed by the conference server if a desired topic of the participant is no longer detected.

14. The computerized real-time data processing method of claim 9, wherein the NLP flags a thumbnail for recognition if a desired topic of the participant is detected, wherein the flag is a sound, color, text, or other sensory output on the participant's device.

15. The computerized real-time data processing method of claim 8, wherein the topic is stored in a topics database when concluded and the topic can be accessed by a participant by using an icon on a dashboard of the participant device.

16. The computerized conferencing method of claim 8, wherein the conference server is further configured to permit a unique participant to join the conference, via a GUI of the unique participant's participant device, at any time and leave the conference at any time.

17. A real-time data processing system for determining topics being presented during a conference, the real-time data processing system comprising:

a tangible, non-transitory memory configured to communicate with a system processor of the real-time data processing system, wherein the tangible, non-transitory memory comprises instructions stored thereon that, in response to execution by the system processor, cause the system to:

identify, utilizing an NLP in communication with a topic identifier and a conference server, topics in a conference presented by the conference server based on thematic elements in a conference participant's speech or a host's speech, wherein the topic identifier continuously updates the topics as the conference progresses;

display as a thumbnail, on a display on each of one or more participant devices in communication with the conference server, (a) one or more topics identified by the NLP that were previously discussed during the conference, and (b) a topic identified by the NLP that is presently being discussed, wherein the thumbnail represents a real-time, topic-by-topic analysis of the conference and the thumbnail is updated as the conference progresses and different topics are addressed in the conference; and permitting a participant, by utilizing one of the one or more participant devices that is unique to the participant, to (a) watch all of, or a portion of, the conference, or (b) join all of, or a portion of, the conference with the capability of joining a discussion in the conference.

18. The real-time data processing system of claim 17, wherein the conference server identifies the most-watched conference topics and a dashboard on each of the one or more participant devices includes an icon configured to select one or more of the most-watched topics and play them on the participant device.

19. The real-time data processing system of claim 17 that further includes a security server in communication with the NLP, wherein the security server is configured to detect security keywords indicating restrictions or distribution of a topic content and that directs the NLP or the conference server to block the content from being provided to certain of the one or more participant devices.

20. The real-time data processing system of claim 17, wherein the conference server directs the at least one of the one or more participant devices to display (a) one or both of a topic being discussed, and (b) the conference host.

* * * * *